(12) United States Patent
Wachtler

(10) Patent No.: US 6,785,979 B2
(45) Date of Patent: Sep. 7, 2004

(54) APPARATUS AND METHOD FOR MEASURING CABLES FOR A WIRE BUNDLE

(75) Inventor: Thomas M. Wachtler, Hickory Creek, TX (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/266,501

(22) Filed: Oct. 8, 2002

(65) Prior Publication Data

US 2004/0064960 A1 Apr. 8, 2004

(51) Int. Cl.⁷ ................................................ G01B 3/00
(52) U.S. Cl. .......................... 33/732; 33/571; 33/712; 33/562; 33/566
(58) Field of Search .................... 33/732, 571, 750, 33/751, 712, 549, 561.1, 562, 563, 566, 733, 738, 746, 555.3

(56) References Cited

U.S. PATENT DOCUMENTS

| | | | | |
|---|---|---|---|---|
| 1,816,695 A | * | 7/1931 | Pope | 33/712 |
| 2,241,979 A | * | 5/1941 | Case | 33/712 |
| 3,290,785 A | * | 12/1966 | Johnson | 33/751 |
| 3,696,511 A | * | 10/1972 | Bixler et al. | 33/712 |
| 3,985,168 A | * | 10/1976 | Lundquist | 33/DIG. 9 |
| 4,120,094 A | * | 10/1978 | Pfaelzer | 33/524 |
| 4,689,891 A | * | 9/1987 | Clark | 33/562 |
| 5,148,611 A | * | 9/1992 | Raetzel | 33/549 |
| 6,098,301 A | * | 8/2000 | Kapphahn | 33/732 |
| 6,134,798 A | * | 10/2000 | Duncan et al. | 33/712 |
| 6,321,457 B1 | * | 11/2001 | Lariviere et al. | 33/562 |
| 6,449,868 B1 | * | 9/2002 | Kumagae | 33/833 |
| 6,681,496 B2 | * | 1/2004 | Law et al. | 33/645 |

* cited by examiner

*Primary Examiner*—Christopher W. Fulton
*Assistant Examiner*—Amanda J Hoolahan
(74) *Attorney, Agent, or Firm*—Harness Dickey & Pierce P.L.C.

(57) ABSTRACT

Apparatus and method for measuring cables of varying diameters to be used in a wire bundle. The apparatus involves a support platform having a groove formed therein which is laid out to have at least one U-shaped turnaround portion. The groove is further canted such that it opens at an angle of about 4.85° away from an interior area defined by the U-shaped arc. This allows cables of varying diameters to be placed in the groove during measuring and automatically compensates for the differences in diameter of the cables. Thus, each cable laid into the groove and measured in accordance with the length of the groove will have the same length, regardless of differences in the diameters of the cables.

19 Claims, 3 Drawing Sheets

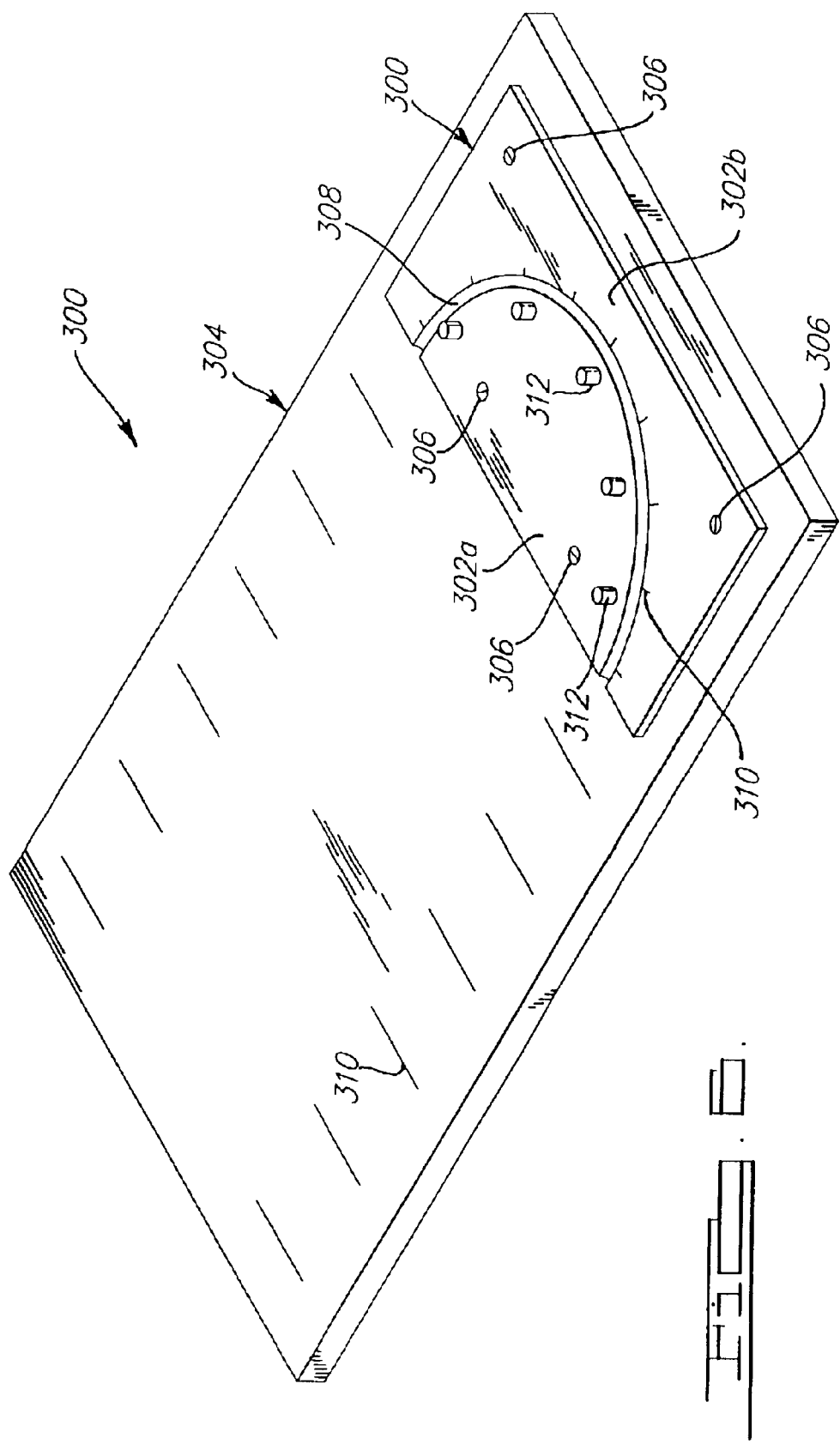

US 6,785,979 B2

APPARATUS AND METHOD FOR MEASURING CABLES FOR A WIRE BUNDLE

FIELD OF THE INVENTION

The present invention relates to the measurement of cables used to form wire bundles, and more particularly to a measuring apparatus and method that allows cables to be laid out in a non-linear orientation for measuring, thereby saving significant work space in a manufacturing facility.

BACKGROUND OF THE INVENTION

When measuring cables that are used to form wiring harnesses, it has traditionally been required to lay each cable out in a straight line for measuring prior to cutting the cable. Obviously, for long cable lengths this is required, a suitably long support table. In a work shop or a factory where wire bundles are manufactured on a large scale, the need to lay out cables in a straight line thus can require considerable floor space to accommodate the long tables on which the cables are laid out and measured prior to cutting. With wire bundles used in large commercial aircraft, the lengths of such bundles can approach 200 feet or more (60.67 meters). Accordingly, it will be appreciated that the need to lay such long wire bundles out in a straight line and to then tie the individual cables with appropriate ties can require a table of very long lengths, and also considerable time spent by workers walking the lengths of such tables while manufacturing the wire bundles.

As will be appreciated, it has heretofore not been possible to measure cables having various diameters while the cables are laid in a curving or non-linear pattern. This is because as the diameter of a cable increases, routing the cable around a given arc will require slightly greater lengths of cable. This is due to the fact that the axial center of the cable is moving farther and farther from the arc as the diameter of the cable increases. Accordingly, this has necessitated that the cables of varying diameters which are to be secured together in a single wire bundle be laid out in a straight line during the measurement process.

Accordingly, there exists a need for an apparatus and method for use in manufacturing wire bundles in which cables of varying diameters can be laid out in a non-linear pattern during measuring and wire bundle construction operations to save work table space. Such an apparatus and method would require significantly shorter work tables than those presently used in wire bundle manufacturing operations. This would also significantly reduce the amount of floor space required in a factory or work shop where the wire bundles are being manufactured. Furthermore, it would improve the efficiency of workers by significantly reducing the walking back and forth along long support tables during the wire bundle construction process.

SUMMARY OF THE INVENTION

The present invention is directed to an apparatus and method for enabling cables of varying diameters to be laid out in a non-linear pattern during measuring and construction of wire bundles. The apparatus and method automatically compensates for the varying thickness of individual cables when same are laid out in a non-linear orientation such that all of the cables measured and tied together will have a common length once they are laid out in a straight line after assembly.

One preferred embodiment of the present invention is directed to a support platform having a groove laid out in a double U-shaped arc. The non-linear groove thus forms two 180° turnarounds for cables that are laid therein during the wire bundle construction process. The groove is further canted or angled away from a vertical plane orthogonal to a surface of the support platform such that the groove opens slightly outwardly away from an inside edge of the groove. This slight degree of canting automatically compensates for varying thicknesses of cables laid into the groove. Thus, cables of varying thicknesses can be laid into the groove during the manufacturing process, tied together with suitable ties, and the resulting cables will all have an identical length.

The apparatus and method of the present invention essentially reduces the length of the work table required to support the cables during the assembly process by at least about 50%, and in some preferred embodiments by 66% or more. This translates into a significant reduction in the amount of floor space required for the tables that are typically needed in producing wire bundles. It also translates into a significant savings in man hours during the manufacturing process by eliminating the need to have workers walking back and forth along the full length of very long work tables.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of an end of a single cable laid out in a curving orientation illustrating the location of the point within its thickness where there is no tension or compression occurring in the material of the cable;

FIG. 6 is a perspective view of an alternative preferred embodiment of the present invention where the cable support platform is only used for providing a turnaround portion for the apparatus.

DETAILED DESCRIPTION OF THE PREFERRED EMBODIMENTS

The following description of the preferred embodiment(s) is merely exemplary in nature and is in no way intended to limit the invention, its application, or uses.

Figure 1:
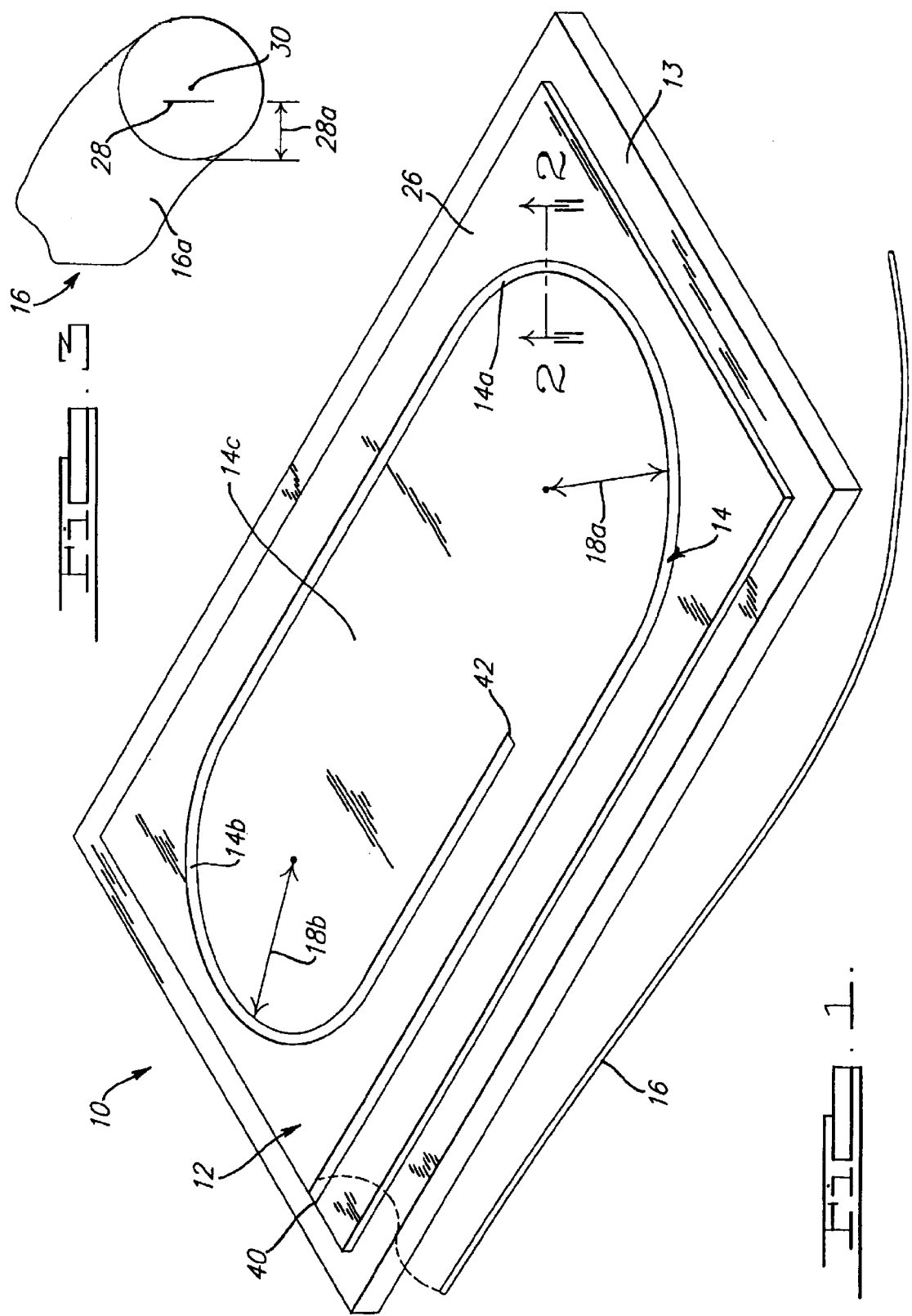
FIG. 1 is a perspective view of a work table in accordance with a preferred embodiment of the present invention.

Referring to FIG. 1 there is shown an apparatus 10 in accordance with a preferred embodiment of the present invention. The apparatus 10 essentially forms a support surface for supporting individual lengths of cables (i.e., wires) that are to be measured and bundled together to form a wire bundle. The apparatus 10 comprises a cable support platform 12 having a non-linear groove 14 forming a curving channel. The cable support platform 12 is supported on a suitable work table 13. The non-linear groove 14 has two 180° turnaround portions 14a and 14b. The groove 14 is further arranged to form somewhat of an oval shape, for a cable 16 laid into the groove 14. The cable support platform 12 may be formed from any suitable material but in one preferred form comprises a polycarbonate sheet preferably approximately 0.25–0.75 inch (6.35 mm–19.05 mm) thick, with the groove 14 preferably extending substantially the entire thickness of the platform. For ease of manufacturing the cable support platform 12, the platform may be formed in two or more sections that are fit together to produce the groove 14. Just as an example, the cable support platform 12 may be formed from a plurality of sections and be assembled together with suitable fastening elements to form a unitary platform. In this instance, the platform could be formed from various sections that abut one another such that their linear and arcuate edge surfaces cooperatively form the groove 14. As such, the depth of the groove 14 would extend through the entire thickness of the platform 12. Alternatively, the groove 14 could be precision machined into a single piece of material forming the cable support platform 12. For simplicity, the cable support platform 12 will be described hereinafter as being formed from a single piece of material.

The groove 14 is further arranged such that the two radii of curvature, represented by reference numerals 18a and 18b, preferably comprise a distance within the range of about 24 inches (60.96 cm) and 28 inches (71.12 cm), respectively. In the embodiment shown in FIG. 1, radius 18b comprises a radius of about 24 inches and radius 18a comprises a radius of about 28 inches. However, it will be appreciated that the radii of curvature 18a and 18b could each vary significantly from these dimensions. It is anticipated that the overall length of the cables to be measured and the overall thickness of each cable will determine in part the optimum radii of curvature for the two turnaround portions 14a and 14b. Also, it will be appreciated that a cable support platform 12 could be constructed with a groove having only a single U-shaped turnaround portion if desired, or a groove having virtually any curving pattern that accomplishes the objective of reducing the overall length of the cable support platform 12.

Figure 2:
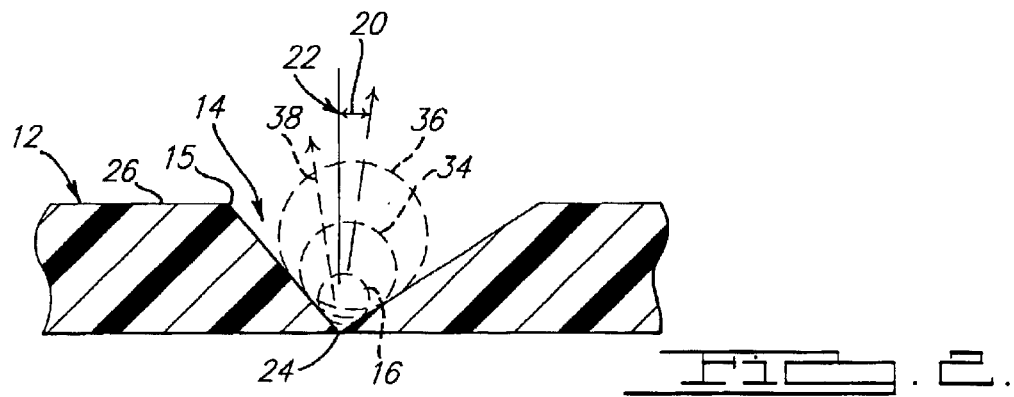
FIG. 2 is a cross-sectional view of the apparatus of FIG. 1 taken in accordance with section line 2—2 in FIG. 1.

Referring to FIG. 2, the construction of the groove 14 can be seen in greater detail. The groove 14 preferably comprises an approximately 90° groove. The groove 14 may have a depth that varies considerably depending on the number and diameters of the cables required to be supported therein. However, in one preferred form the groove 14 comprises a depth between about 0.25 inch–0.75 inch (6.35 mm–19.05 mm), and more preferably about 0.5 inch (12.7 mm). It will be appreciated, however, that the depth of the groove 14 is only limited by the thickness of the material forming the cable support platform 12.

The groove 14 is canted or angled so that the groove 14 opens slightly outwardly away from an interior area 14c bounded by the groove 14 or, put differently, opens away from an inside edge 15 of the groove 14. More specifically, the groove 14 is canted at an angle between about 4.50°–5.00°, and more preferably at an angle of about 4.85°. This angle is represented by reference numeral 20, and it is formed relative to a vertical line 22 extending from a bottom point 24 of the groove 14, where the vertical line 24 also is orientated perpendicular to an upper surface 26 of the cable support platform 12. The 4.85° angle has been empirically determined to be that angle that accounts for varying thicknesses of the cables that are laid into the groove 14 to allow cables of varying diameters to be measured to an identical length. The 4.85° angle takes into account that with any cable that is laid about an arc, the point at which there is no tension or compression in the cable is defined by a line extending approximately 44% into the thickness of the cable, relative to the surface of the cable facing the inside of the arc. Thus, referring to FIGS. 2 and 3, for cable 16, this point of no tension or compression can be defined by line 28, which is offset slightly from an axial center 30 of the cable 16 nearer surface 16a which extends along an inside edge of the arc that the cable 16 forms. Distance line 28a represents the 44% distance into the axial center 30 of the cable 16 from the surface 16a.

Thus, from FIG. 2, it can be appreciated that for cables 34 and 36, if the groove 14 was not canted slightly at the 4.85° angle, the vertical line 28 defining the point of no tension and no compression extending through each cable 16, 34 and 36 would form a vertical line 38 which extends inwardly toward the interior area formed by the groove 14. Thus, as cables of increasing thickness are placed in the groove 14, the length would change for the measured cable 16 at those areas where the cables 16, 34 and 36 are extending around an arc. Put differently, if it were not for the offset of 4.85°, cable 34, when laid into the groove 14, would have a length that is slightly less than that of cable 16. Similarly, cable 36, being greater in diameter than cable 34, would also have a length that is slightly less than cable 34. Accordingly, the offset of 4.85° indicated by reference numeral 20 allows cables of varying diameters to be placed in the groove 14 such that each of the cables can be accurately measured and will all have an identical length at any point along the groove 14.

Referring further to FIGS. 1 and 2, in use each of the cables 28, 34 and 36 are placed in the groove 14 preferably together. Point 40 may define a first end of the groove 14 and point 42 a second end. Each of the cables 16, 34 and 36 are preferably tied at predetermined points along the groove 14, such as for example, about every 6 inches (15.24 cm). The cables 16, 34 and 36 can be cut at any point along the groove 14 and when straightened out will have virtually identical lengths. It will be appreciated that the two U-shaped portions 14a and 14b allow a significantly shorter work table to be employed than what would be required if the cables 16, 34 and 36, had to be laid out in a perfectly straight path. The apparatus 10 effectively reduces the length of the work table needed by more than 50%.

It will also be appreciated that when forming wire bundles, cables are typically placed in the groove 14 so as to form a circular bundle configuration when viewed in cross-section. Also, a cable tie is typically laid into the groove 14 before the cables. Thus, when the cables are forming a circular bundle, certain ones of the cables will typically be resting next to one another rather than perfectly on top of one another as shown in FIG. 2. In this instance, the difference in length of the cables at any point along the groove 14 will be negligible due to the 4.85° canting of the groove 14.

Figure 4:
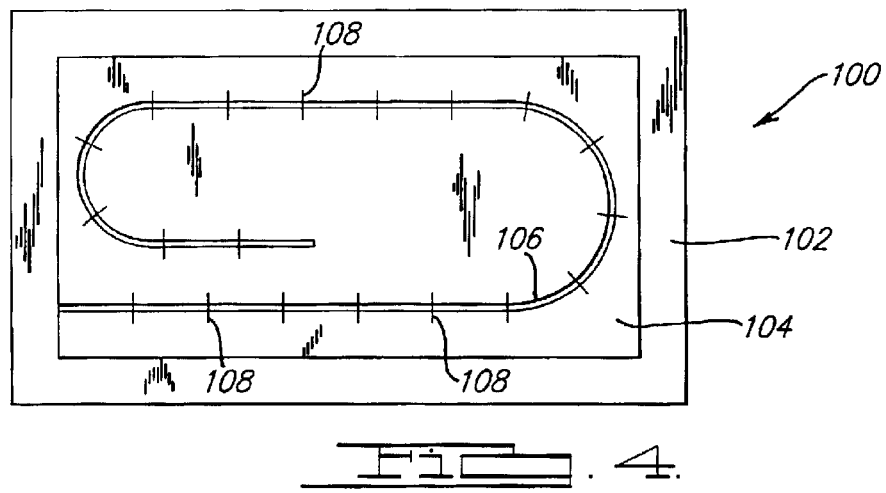
FIG. 4 is a plan view of an alternative preferred embodiment of the apparatus of the present invention incorporating a measurement board underneath the cable support platform for enabling a worker to quickly determine where to apply ties around a bundle of cables laid out in the groove in the cable support platform.

Referring now to FIG. 4, an apparatus 100 in accordance with an alternative preferred embodiment of the present invention is shown. Apparatus 100 is identical to the apparatus 10 but also includes a measurement table 102 disposed underneath a cable support platform 104. The cable support platform 104 includes a groove 106 identical in orientation to groove 14 of apparatus 10. The measurement table 102 is adapted to support the support platform 104 and includes markings 108 denoting various points where ties are to be placed on the cables placed in the groove 106. Each of markings 108 may also denote a length measurement so that workers can readily measure for desired cable lengths when constructing wire bundles on the apparatus 100. In this regard it will be appreciated that the support platform 104 is made from a translucent material, such as a clear polycarbonate, so that the markings 108 can be easily seen while laying cables in the groove 106.

Figure 5:
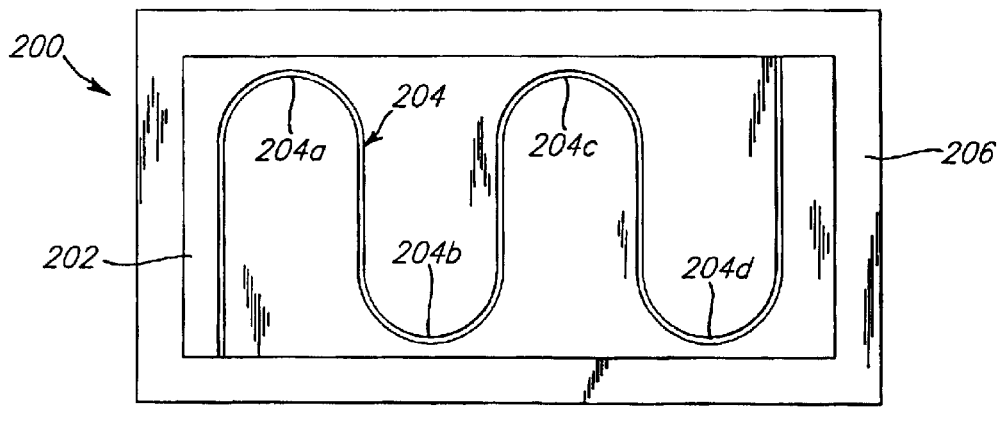
FIG. 5 is a view of another alternative preferred embodiment of the present invention wherein the cable support platform incorporates a cable supporting groove having a plurality of parallel, U-shaped turnarounds.

Referring to FIG. 5, another apparatus 200 is shown in accordance with another alternative preferred embodiment of the present invention. The apparatus 200 includes a support platform 202 formed with a groove 204 comprising four 180 degree, U-shaped turnaround portions 204a–204d. The groove 204 is constructed in a manner ident apparatus 10. The support platform 202 is supported by a table 206 or other suitable work surface. While the markings 108 of apparatus 100 are not shown, it will be appreciated that the table 206 could just as readily incorporate suitable distance markings if desired.

Referring to FIG. 6, there is shown an apparatus 300 in accordance with another alternative preferred embodiment of the present invention. The apparatus is similar to the apparatus 100 in that it includes a cable support platform 302. The cable support platform 302 is secured to a table surface 304 or other like support structure. In this embodiment, the cable support platform 302 is comprised of first and second portions 302a and 302b, which are secured to the table surface 304 by fasteners 306. Fasteners 306 may comprise threaded fasteners, rivets or any other suitable fastening implements. Adhesives could also be used to secure the two sections 302a and 302b to the table surface 304. The two sections 302a and 302b are formed such that the arcuate edge surfaces of each, when butted together, form a groove 308 within which a portion of the cable 16 (or a plurality of cables) may be laid into.

The groove 308 is otherwise identical to the groove 14. Markings or some form of indicia 310 are provided on the table surface 304 and on the cable support platform 302 to indicate distance. Also, vertical pegs 312 are provided to assist a worker in more easily laying the cable 16 (or cables) into the groove 308 without the worker having to walk around the perimeter of the table surface 304.

It will be noted that with apparatus 300, the cable support platform 302 is only used for the turnaround portion. Put differently, cable 16 (or cables) would be laid onto the table surface 304 and the groove 302 would only be used with the portion of the cable 16 (or cables) that extend in a U-shaped path, since this is the portion of the constructed wire bundle where the differences in diameters of the cables need to be taken into account.

From the foregoing description, it will be appreciated that the preferred embodiments of the present invention each provide a means to lay a plurality of cables in a variety of curved orientations during a wire bundle assembly process while ensuring that the cables will all have identical lengths once the wire bundle is fully assembled and removed from the groove 14, 106 or 308. The construction of the groove 14, groove 106, groove 204 or groove 308 thus each compensate for inaccuracies in the lengths of cables having differing diameters that would be present if the cables were simply laid out in a curved orientation without constructing the groove to account for the varying diameters of the cables. The present invention dramatically reduces the size of the worktable needed to support long wire bundles during a manufacturing process.

The present invention also significantly reduces the amount of work space required to measure and cut cables to be used in wire bundles. By enabling each cable to be turned 180° in at least one U-shaped arc, the required table space for measuring and cutting any given length of cable is effectively reduced by at least about 50%. This translates into a significant reduction in the amount of floor space required within a work shop or factory where wire bundles are being assembled. It also translates into a significant savings in man hours by eliminating the need for workers to walk back and forth along extremely long work tables.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for enabling cables of varying diameters to be measured to an identical length after being laid in a non-linear orientation, comprising:

a support platform having a non-linear groove formed in a surface thereof, said groove forming a curving channel having a predetermined radius of curvature, and operable to at least partially support said cable therein;

said groove being rotated from a vertical plane extending orthogonal to said surface of said support platform to thereby cant said groove such that said groove opens slightly outwardly away from an inside edge of said groove; and wherein said canting of said groove enables cables of varying diameters to be laid therein and automatically compensates for said varying diameters when measuring cables to be used in wire bundles requiring a common length, and therefore eliminates the need to lay each of said cables in a straight line during a measuring process.

2. The apparatus of claim 1, wherein said groove is rotated between approximately 4.5°–5.0° so as to be canted outwardly away from said inside edge thereof.

3. The apparatus of claim 2, wherein said groove is rotated approximately 4.85° so as to be canted outwardly away from said inside edge thereof.

4. The apparatus of claim 1, wherein said groove comprises an approximately 90 degree groove.

5. The apparatus of claim 1, wherein said curving channel forms a 180 degree turnaround portion.

6. The apparatus of claim 1, wherein said groove is disposed in an upper surface of said support platform.

7. The apparatus of claim 1, wherein said support platform comprises a translucent material.

8. The apparatus of claim 1, wherein said curving channel includes a 180 degree turnaround having a radius of curvature of between approximately 24 inches and 28 inches.

9. The apparatus of claim 1, wherein said curving channel comprises a pair of 180 degree turnaround portions.

10. The apparatus of claim 1, wherein said curving channel includes a pair of facing, 180 degree turnaround portions.

11. The apparatus of claim 1, further comprising a measurement table for supporting said cable support platform.

12. The apparatus of claim 1, wherein said curving channel forms a plurality of parallel arranged, 180 degree turnarounds.

13. An apparatus for enabling cables of varying diameters to be measured to an identical length after each is laid in a non-linear orientation, comprising:

a support platform having a groove formed in an upper surface thereof, said groove forming a curving channel and operable to support a plurality of cables therein;

said groove being rotated between approximately 4.5°–5.0° from a vertical plane extending orthogonal to said surface of said support platform to thereby cant said groove such that said groove opens slightly outwardly relative to an inside edge of said groove; and wherein said canting of said groove enables cables of varying diameters to be laid therein and automatically compensates for said varying diameters when measuring cables to be used in wire bundles requiring a common cable length, and therefore eliminates the need to lay each of said cables in a straight line during a measuring process.

14. The apparatus of claim 13, wherein said groove comprises a 90 degree groove.

15. The apparatus of claim 13, wherein said support platform comprises a translucent platform.

16. The apparatus of 13, wherein said curving channel comprises a 180 degree turnaround having a predetermined radius of curvature.

17. The apparatus of claim 13, wherein said support platform is comprised of a polycarbonate material.

18. The apparatus of claim 17, further comprising a measuring table for supporting said support platform and facilitating measuring of cables laid into said groove.

19. The apparatus of claim 13, wherein said groove forms a plurality of a parallel arranged, 180 degree turnaround portions.

* * * * *